March 5, 1968 R. C. MILLER 3,371,892
MECHANICAL MOUNTING APPARATUS
Filed Sept. 12, 1966
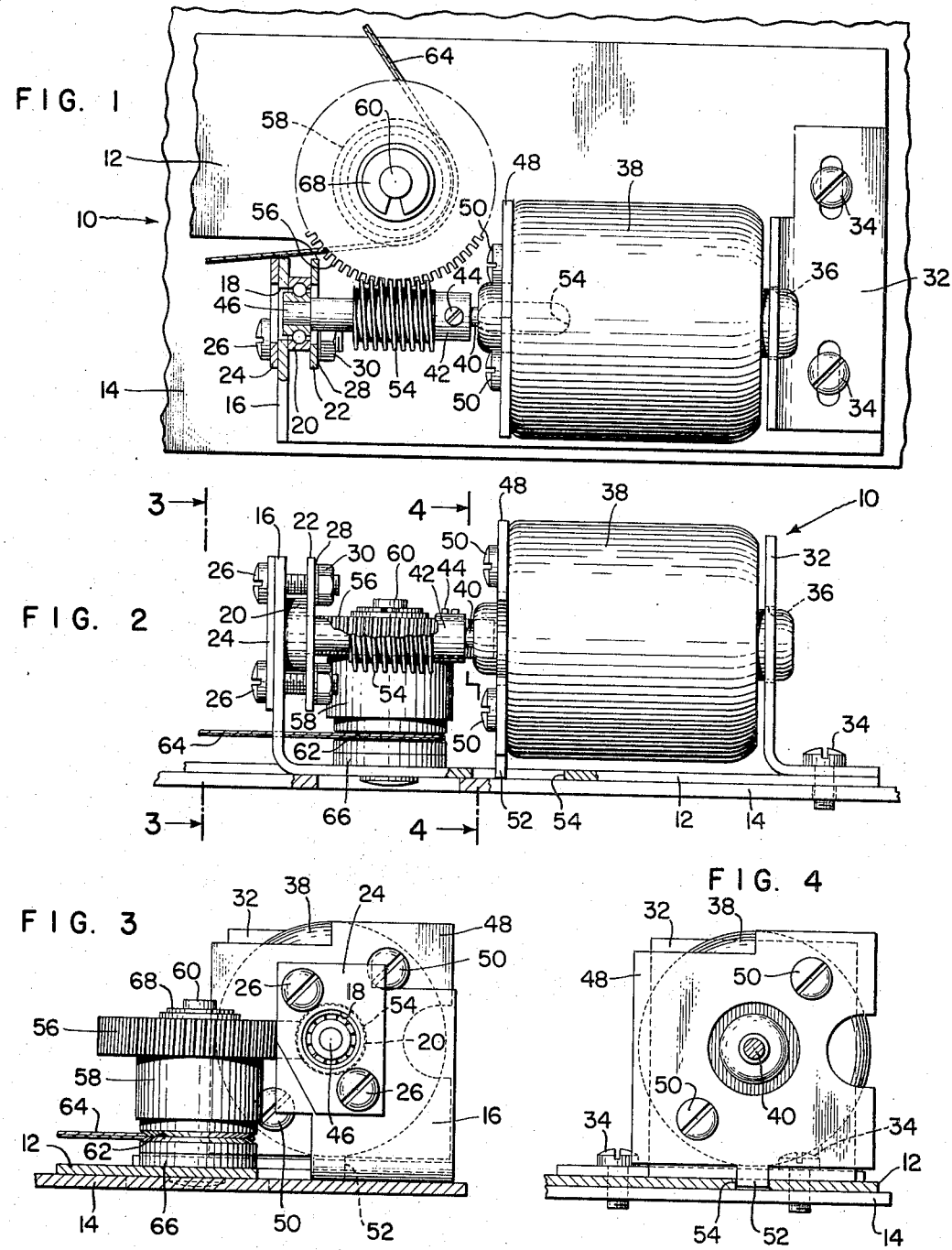
INVENTOR.
RONALD C. MILLER
BY M. Michael Carpenter
ATTORNEY.

United States Patent Office 3,371,892
Patented Mar. 5, 1968

3,371,892
MECHANICAL MOUNTING APPARATUS
Ronald C. Miller, Norristown, Pa., assignor to Honeywell Inc., Minneapolis, Minn., a corporation of Delaware
Filed Sept. 12, 1966, Ser. No. 578,573
7 Claims. (Cl. 248—2)

The present invention relates to a mechanical mounting apparatus and, more particularly, to a device for mounting a driving member in a manner which prevents the radial or axial loading thereof.

In an electronic instrument, or the like, it is frequently desirable to provide a driving member such as an electrical motor, for imparting a mechanical motion to a load through a driven member, such as a gear train. Such a driving member is often required to deliver a large output of thrust or torque over an extended period of time thereby causes substantial physical wear to its components. This situation is generally compensated for by strengthening the physical characteristics of the driving member components. To achieve a desired balance between the required output of the driving member and the physical characteristics of its components, it becomes necessary to sacrifice other desirable features, such as miniaturization, standardization, and economy. An example of such a situation may be found when a small economical drive motor is utilized for providing the rotational input torque for a gear train. In such an arrangement, a drive motor is generally chosen which delivers the torque required and also provides the desired minimum hours of operation. Often a smaller motor is capable of providing the needed torque; but that motor is impractical, since the components therein will not provide the required minimum hours of operation. In this situation a larger motor must be specified for use.

Therefore, one object of the present invention is to provide a mounting arrangement for a driving member which will extend the usefulness thereof.

Another object of this invention is to provide a motor mounting arrangement which will allow the motor to deliver its maximum torque without causing excessive component wear for decreasing the operating life thereof.

Still another object of the present invention is to provide a motor mounting arrangement which will prevent excessive radial or axial loading of the motor bearings.

Yet another object of the instant invention is to provide a motor mounting device which allows a small, economical motor to function, for an extended life cycle, in an operating condition which would normally reduce the life expectancy of that motor.

A further object of this invention is to establish a motor mounting arrangement wherein an external member carries the radial and axial load of the motor bearings for extending the life expectancy of the motor, allowing the motor to deliver a maximum output torque.

Still a further object of the present invention is to provide a motor mounting arrangement, utilizing three bearings upon a single shaft, which will allow for the misalignment of the bearings due to the nonlinearity of the shaft.

Other objects and many attendant advantages of the present invention will be readily appreciated as the same becomes better understood by reference to the following detailed description when considered in connection with the accompanying drawings, wherein:

FIG. 1 is a top horizontal view, showing the motor mounting arrangement;

FIG. 2 is a front elevation view of the motor mounting arrangement shown in FIG. 1;

FIG. 3 is a sectional view taken along line 3—3 of FIG. 2; and

FIG. 4 is a sectional view taken along line 4—4 of FIG. 2.

Referring now to the drawings, FIGS. 1 and 2 shows a motor mounting arrangement 10 having a mounting plate 12 which may be attached to a suitable frame member 14. The mounting plate 12 is centrally relieved along its longitudinal axis for forming a bifurcated section having one leg thereof bent upwardly, at a right angle to the plane of the mounting plate 12, for forming a shaft mounting portion 16. An aperture 18 in the shaft mounting portion 16, FIG. 3, provides a relief for preventing a sliding contact of an inner race of a low friction rotational member, such as a ball bearing 20, with the mounting portion 16. The bearing 20 is retained in alignment with the aperture 18 by a pair of clamping plates 22 and 24 which clamp the outer race of the bearing 20 against the periphery of the aperture. The clamping plates 22 and 24 are, in turn, retained in their clamping arrangement by a plurality of screws 26 which extend through the outer clamping plate 24, the shaft mounting portion 16, the clamping plate 22, and individually associated lock washers 28 to be secured therein by a plurality of nuts 30.

A lateral restraining plate 32 mounts on the mounting plate 12, as by screws 34. The restraining plate 32 is arranged in parallel relation to the shaft mounting portion 16 and perpendicular to the plane of the mounting plate 12. An aperture 36, within the restraining plate 32, receives a cylindrical portion of a motor 38 in a slidable arrangement whereby the motor is free to move along its longitudinal axis but is restrained from lateral motion by the contiguous relationship between the motor and the aperture. A motor shaft 40 extends from one end of the motor 38 along the longitudinal axis thereof and terminates within a shaft extension 42 secured thereto by a set screw 44. The shaft extension 42 is relieved at the end opposite the motor 38 for forming a reduced end portion 46 which fits snugly into the inner race of the bearing 20. Through this arrangement the bearing 20, shaft extension 42, motor shaft 40, and motor 38 are aligned along a common longitudinal axis. Thus, the motor is free to move along its longitudinal axis, restrained only by the extension shaft 42 within the bearing 20, while restrained laterally by the aperture 36 within the lateral restraining plate 32. A radial restraining plate 48 is attached to the shaft end of the motor 38, as by a plurality of screws 50, in parallel relationship with the lateral restraining plate 32 and shaft mounting portion 16. A tab member 52, FIG. 4, extends downwardly from the edge of the radial restraining plate 48 for positioning itself in cooperation with a slot 54 in the mounting plate 12. The slot 54 is elongated along its axis parallelling the longitudinal axis of the motor 38 and is restricted along the axis laterally arranged thereto for providing a tightly fitting relationship between tab 52 and slot 54 in the lateral direction. Thus, the motor remains free to move relative to its longitudinal axis but is prevented from a rotational motion about that axis by the presence of the plate 48 and the cooperation of its tab 52 in the slot 54.

In the illustrated embodiment of the present invention, a worm gear 54 is attached to the extension shaft 42, as by a press fit. The worm gear 54 engages a worm wheel gear 56 having a hub 58 which is rotationally positioned over a mounting post 60 attached to the mounting plate 12, as by riveting. The hub 58 includes a groove 62 for engaging a cable 64. Cable 64 is used to drive a utilizing device, not shown, at a distance remote from the motor mounting arrangement. The hub 58 is slidably separated from the mounting plate 12 by a washer 66 constructed from a low friction material, such as polytetrafluoroethylene, and is retained upon the post 60 by a clip ring 68. When the driving motor 38 is energized, the rotational motion of the shaft 40 and worm gear 54 creates radial and axial loading forces along the shaft. The axial forces include both longitudinal and lateral loading. These forces, in the absence of the present invention, would normally create excessive wear upon the motor bearings, not shown, for reducing their operational life span. The present invention adds a third bearing 20 for supporting the motor 38 and carrying its axial and radial loading forces. The unique arrangement of the lateral restraining plate 32 and the radial restraining plate 48 allows the motor 48 to be displaced longitudinally along its axis for insuring that the loading forces from the worm 54 and worm wheel 56 are carried by the third bearing 20. In order to eliminate the design problems generally associated with the use of three bearings upon a single shaft, the lateral and radial restraining plates 32 and 48 are not directly attached to the mounting plate 12. That is, the motor 38 is free to move laterally and radially, restrained only by the bearing 20, the aperture 36, and the tab 52 within slot 54. This allows the motor to float within the restraints of its associated mounting plates while placing the axial and radial loading forces fully upon the bearing 20. Therefore, the relative size and strength of the bearing 20 may be adjusted for supporting the motor load and extending motor life in accordance with the forces exerted thereon, without requiring a change of motor size. Thus, one design parameter has been eliminated in the selection of a proper driving motor and a smaller motor, capable of delivering the required torque, may be utilized without consideration of motor wear and the resultant reduction of motor life.

Accordingly, in keeping with the objects of the present invention there has been provided a motor mounting arrangement wherein the driving forces of the motor to the gear train are carried by a third bearing externally located from the motor and supporting the motor through a shaft extension. Further, the motor is provided with a floating mounting arrangement in the form of front and back mounting plates for allowing a limited amount of lateral, longitudinal, and radial movement thereby preventing the overloading of three bearings upon the single shaft.

Many modifications and variations of the present invention will become obvious to those skilled in the art, in light of the above teachings, and it should therefore be understood that the embodiment described hereinabove is an illustration rather than a limitation of the scope of the present invention. Consequently, the present invention should be limited only by the appended claims.

What is claimed is:
1. A mounting arrangement for a driving member having an output means passing through the longitudinal axis thereof for engaging a load comprising,
   mounting means having a mounting portion perpendicular to said longitudinal axis of said driving member,
   low friction rotational means mounted upon said mounting portion in line with said longitudinal axis of said driving member,
   first restraining means for restraining the lateral motion of said driving member while allowing relative motion along said longitudinal axis,
   second restraining means for restraining the radial motion of said driving member while allowing relative motion along said longitudinal axis, and
   said output means attached to said low frictional rotational means arranged for engaging said load and transferring the forces associated therewith to said low friction rotational means rather than said driving member.

2. A mounting arrangement as claimed in claim 1 wherein said driving means includes a motor and said output means a motor output shaft.

3. A mounting arrangement as claimed in claim 2 additionally comprising a shaft extension means extending from said output shaft and attached to said low friction rotational means and arranged to engage said load and transfer the forces associated therewith to said low friction rotational means rather than said motor.

4. A mounting arrangement as claimed in claim 3 wherein said low friction rotational means includes a ball bearing and clamping means for securing said bearing to said perpendicular mounting portion of said mounting means.

5. A mounting arrangement as claimed in claim 3 wherein said first restraining means includes a lateral restraining plate attached to said mounting means in parallel relationship with said mounting portion thereof and having an aperture therein through which said motor contiguously passes.

6. A mounting arrangement as claimed in claim 3 wherein said second restraining means includes a radial restraining plate attached to said motor in parallel relationship with said mounting portion of said mounting means, said mounting portion having an aperture therein, and said radial restraining plate cooperating with said aperture for preventing radial motion of said motor about said longitudinal axis thereof.

7. A mounting arrangement for a driving motor having an output shaft which extends along the longitudinal axis of said motor for engaging a load comprising,
   mounting plate means having a mounting portion perpendicular to the longitudinal axis of said driving motor,
   low friction rotational means mounted upon said mounting portion in line with said longitudinal axis of said driving motor,
   lateral restraining plate means attached to said mounting plate means for restraining the lateral motion of said driving motor while allowing relative motion along said longitudinal axis,
   radial restraining plate means attached to said driving motor for restraining the radial motion thereof while allowing relative motion along said longitudinal axis, and
   shaft extension means extending from said output shaft along the longitudinal axis of said driving motor and attached to said low friction rotational means,
   said shaft extension means arranged for engaging said load, driven by said driving motor, and for transferring the radial and axial forces acting thereon to said low friction rotational means rather than said driving motor.

References Cited
UNITED STATES PATENTS

| | | | |
|---|---|---|---|
| 2,030,260 | 2/1936 | Lewis | 310—90 |
| 2,414,975 | 1/1947 | Noble | 248—16 |
| 2,476,515 | 7/1949 | Stevens | 248—2 X |
| 3,307,057 | 2/1967 | Papst | 310—90 |

ROY D. FRAZIER, *Primary Examiner.*

F. DOMOTOR, *Assistant Examiner.*